H. F. Pond.
Dish Drainer.
N° 96,725.    Patented Nov. 9, 1869.
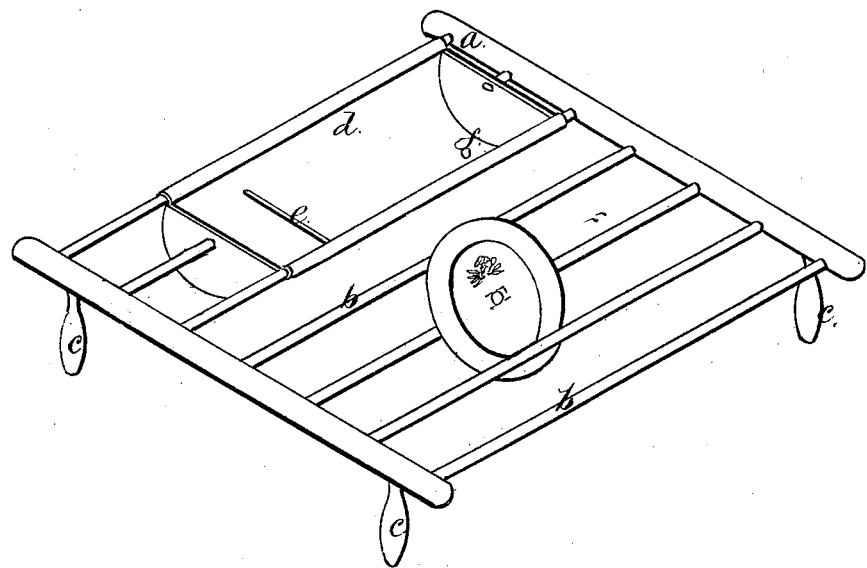
Witnesses
Geo. A. Loring
J. N. Sypher
Inventor:
H. F. Pond.
by his Attorney

United States Patent Office.

HENRY F. POND, OF FRANKLIN, MASSACHUSETTS.

Letters Patent No. 96,725, dated November 9, 1869.

IMPROVED DISH-DRAINER.

The Schedule referred to in these Letters Patent and making part of the same.

*To all to whom these presents shall come:*

Be it known that I, HENRY F. POND, of Franklin, in the county of Norfolk, and State of Massachusetts, have made an invention of a new and useful Device for Draining Dishes while washing; and do hereby declare the following to be a full, clear, and exact description thereof, due reference being had to the accompanying drawing, which is a perspective representation of my invention.

Housekeepers have long felt the want, while washing dishes, of some effective and available device upon which to place plates, and various other articles, to "drain," so called, that is, to allow the excess of water to flow off them, until such time as they are wiped dry with a towel.

The purpose of this invention is to produce a simple and inexpensive device for the above purpose, to be placed in the sink, or other locality in the immediate vicinity of the utensil in which the dishes are washed, and upon which such dishes may be allowed to stand, in such manner that the water shall readily flow from them.

The invention consists in a rack or frame of wood, cast-iron, or other suitable material, provided with legs for elevating it some distance above the bottom of the sink, or other place upon which it may stand, and, by this means, give a free opportunity for escape of water from the dishes, a component part or adjunct of such frame being a short trough or receptacle for knives and forks, spoons, &c., to be explained.

The accompanying drawing exhibits this rack as composed of an enclosing frame, *a*, and a series of parallel bars, *b b*, very much after the manner of an ordinary gridiron, four standards or feet, *c c c c*, being secured to or formed upon the under surface of the four corners of the frame *a*.

The bars should be such distance apart as to support a plate, saucer, or other shallow or flat dish, in an angular position, such dish to be placed between the two bars, in such manner that the gravity of its overhanging portion shall prevent it from dropping between them, as shown in the drawing.

Cups, and other like-shaped dishes, may be placed bottom up upon the top of the bars *b b*.

Furthermore, I affix to a suitable part of the frame, (composed as above described,) preferably in one corner thereof, a short trough, *d*, this trough, near its inner end, being provided with a transverse ledge or rest, *c*, and, at its opposite end, with an outlet-orifice, *f*, to permit of escape of water.

This trough *d* is for reception of knives, forks, spoons, or other similar articles, the ledge *c* supporting them in an inclined position, and allowing the water to run from them, at the same time raising their handles above any water there may be in the bottom of the trough.

This device will be found a very useful one for the purpose intended, and, when not in actual use, may be stowed away in any convenient locality, while its low cost will place it within the reach of all.

Claim.

I claim the above-described device for supporting dishes, knives, and spoons, while draining, such device consisting of the enclosing frame *a* and bars *b b*, when supported upon the feet *c c*, and provided with the trough *d*, in manner and for the purpose as herein explained.

HENRY F. POND.

Witnesses:
HENRY E. POND,
ALEX. THAYER.